(12) United States Patent
Patel et al.

(10) Patent No.: US 9,319,410 B1
(45) Date of Patent: Apr. 19, 2016

(54) ELECTRONIC SHARED-DOCUMENT REPOSITORY

(71) Applicant: Fundology, Inc., Streamwood, IL (US)

(72) Inventors: Kison Patel, Chicago, IL (US); Ralph Leyga, North Cotabato (PH)

(73) Assignee: FUNDOLOGY, INC., Streamwood, IL (US)

( * ) Notice: Subject to any disclaimer, the term of this patent is extended or adjusted under 35 U.S.C. 154(b) by 75 days.

(21) Appl. No.: 14/149,162

(22) Filed: Jan. 7, 2014

(51) Int. Cl.
*H04L 29/06* (2006.01)

(52) U.S. Cl.
CPC .............. *H04L 63/10* (2013.01); *H04L 63/08* (2013.01); *H04L 63/083* (2013.01)

(58) Field of Classification Search
CPC ........ H04L 63/10; H04L 63/083; H04L 63/08
See application file for complete search history.

(56) References Cited

U.S. PATENT DOCUMENTS

| | | | | |
|---|---|---|---|---|
| 5,737,599 | A * | 4/1998 | Rowe | G06F 17/211 |
| 5,781,785 | A * | 7/1998 | Rowe | G06F 17/211 |
| | | | | 707/999.01 |
| 6,557,015 | B1 * | 4/2003 | Bates et al. | 715/229 |
| 6,751,777 | B2 * | 6/2004 | Bates et al. | 715/206 |
| 6,992,687 | B1 * | 1/2006 | Baird et al. | 715/805 |
| 8,196,061 | B1 * | 6/2012 | Bhojan | G06F 3/0483 |
| | | | | 715/787 |
| 8,854,635 | B2 * | 10/2014 | Mishima et al. | 358/1.11 |
| 8,966,593 | B2 * | 2/2015 | Brunn | H04L 67/22 |
| | | | | 726/4 |
| 2002/0055946 | A1 * | 5/2002 | Prager | A63F 7/0676 |
| 2002/0055968 | A1 * | 5/2002 | Wishoff | G06F 9/542 |
| | | | | 709/203 |
| 2003/0065940 | A1 * | 4/2003 | Brezak et al. | 713/201 |
| 2006/0036951 | A1 * | 2/2006 | Marion | G06F 21/31 |
| | | | | 715/733 |
| 2006/0259957 | A1 * | 11/2006 | Tam | G06F 21/10 |
| | | | | 726/3 |
| 2008/0082673 | A1 * | 4/2008 | Dynin et al. | 709/228 |
| 2009/0327408 | A1 * | 12/2009 | Nagase | H04L 67/02 |
| | | | | 709/203 |
| 2010/0042627 | A1 * | 2/2010 | Hanses | G06F 17/30905 |
| | | | | 707/783 |
| 2010/0042702 | A1 * | 2/2010 | Hanses | G11B 27/105 |
| | | | | 709/219 |
| 2013/0040657 | A1 * | 2/2013 | Jackson | G06F 21/84 |
| | | | | 455/456.1 |

* cited by examiner

*Primary Examiner* — Joseph P Hirl
*Assistant Examiner* — J. Brant Murphy
(74) *Attorney, Agent, or Firm* — Invention Mine LLC

(57) ABSTRACT

In an embodiment, a client device receives from a server device one or more bookmark objects associated with one or more respective bookmarks to which a provided authentication credential authorizes access. Each respective bookmark is associated with a respective location in a respective document. The client device presents via a user interface one or more bookmark references corresponding to respective received bookmark objects. The client device receives via the user interface an indication of a selected bookmark reference and sends to the server device a bookmarked-document request specifying the received bookmark object corresponding to the selected bookmark reference. The client device (i) receives from the server device a bookmarked-document object that corresponds to the specified bookmark object and that includes a portion of the associated respective document at the associated respective location and (ii) presents via the user interface the included portion of the associated respective document.

20 Claims, 20 Drawing Sheets

ELECTRONIC SHARED-DOCUMENT REPOSITORY

BACKGROUND

For large transactions (e.g., mergers, acquisitions, or debt or equity offerings), a "data room" or "deal room" may be established to allow interested parties and other stakeholders to review documents that may be relevant to the transaction. A traditional data room may be a physically-secure, continuously-monitored room or other space provided by one of the parties to the transaction. Corporate officers, attorney, and other individuals may travel (often over long distances) to the location of the data room to review hardcopy documents stored in the data MOM.

SUMMARY

A virtual data room may reduce or eliminate costs typically associated with traditional deal rooms. By providing access to relevant documents via the Internet, hardcopies of documents and travel to a physical deal room to review those hardcopies becomes unnecessary.

While virtual data rooms may reduce costs, they may also restrict the ability of individuals reviewing the relevant documents to collaborate amongst each other. The review of the documents becomes a solitary task, with each individual reviewing documents at his or her own computer. Sharing documents and identifying specific locations in documents becomes more difficult than were the individuals to collaborate in a physical data room.

Described herein are various embodiments for an electronic shared-document repository. In an embodiment, a client device sends to a server device an authentication request comprising an authentication credential associated with a user of an electronic-document repository. The client device receives from the server device one or more bookmark objects associated with one or more respective bookmarks to which the authentication credential authorizes access. Each respective bookmark is associated with a respective location in a respective document, and one or more of the bookmarks have been generated by one or more other users of the electronic-document repository. The client device presents via a user interface one or more bookmark references corresponding to respective received bookmark objects. The client device receives via the user interface an indication of a selected bookmark reference and sends to the server device a bookmarked-document request specifying the received bookmark object corresponding to the selected bookmark reference. The client device (i) receives from the server device a bookmarked-document object that corresponds to the specified bookmark object and that includes a portion of the associated respective document at the associated respective location and (ii) presents via the user interface the included portion of the associated respective document.

In an embodiment, a server device (i) receives from a client device an authentication request comprising an authentication credential associated with a user of an electronic-document repository and (ii) sends to the client device one or more bookmark objects associated with respective bookmarks to which the authentication credential authorizes access. Each respective bookmark is associated with a respective location in a respective document, and one or more of the bookmarks have been generated by one or more other users of the electronic-document repository. The server device (i) receives from the client device a bookmarked-document request specifying a respective bookmark object and (ii) sends to the client device a bookmarked-document object that corresponds to the specified bookmark object and that includes a portion of the associated respective document at the associated respective location.

These as well as other aspects, advantages, and alternatives will become apparent to those of ordinary skill in the art by reading the following detailed description, with reference where appropriate to the accompanying drawings. Further, it should be understood that the descriptions provided in this overview and below are intended by way of example and not limitation.

BRIEF DESCRIPTION OF THE DRAWINGS

Various example embodiments are described herein with reference to the following drawings, in which like numerals denote like entities, and in which.

DETAILED DESCRIPTION

The present systems and methods will now be described with reference to the figures. It should be understood, however, that numerous variations from the depicted arrangements and functions are possible while remaining within the scope and spirit of the claims. For instance, one or more elements may be added, removed, combined, distributed, substituted, re-positioned, re-ordered, and/or otherwise changed. Further, where this description refers to one or more functions being implemented on and/or by one or more devices, one or more machines, and/or one or more networks, it should be understood that one or more of such entities could carry out one or more of such functions by themselves or in cooperation, and may do so by application of any suitable combination of hardware, firmware, and/or software. For instance, one or more processors may execute one or more sets of programming instructions as at least part of carrying out of one or more of the functions described herein.

I. EXAMPLE CLIENT AND SERVER DEVICES

Figure 1:
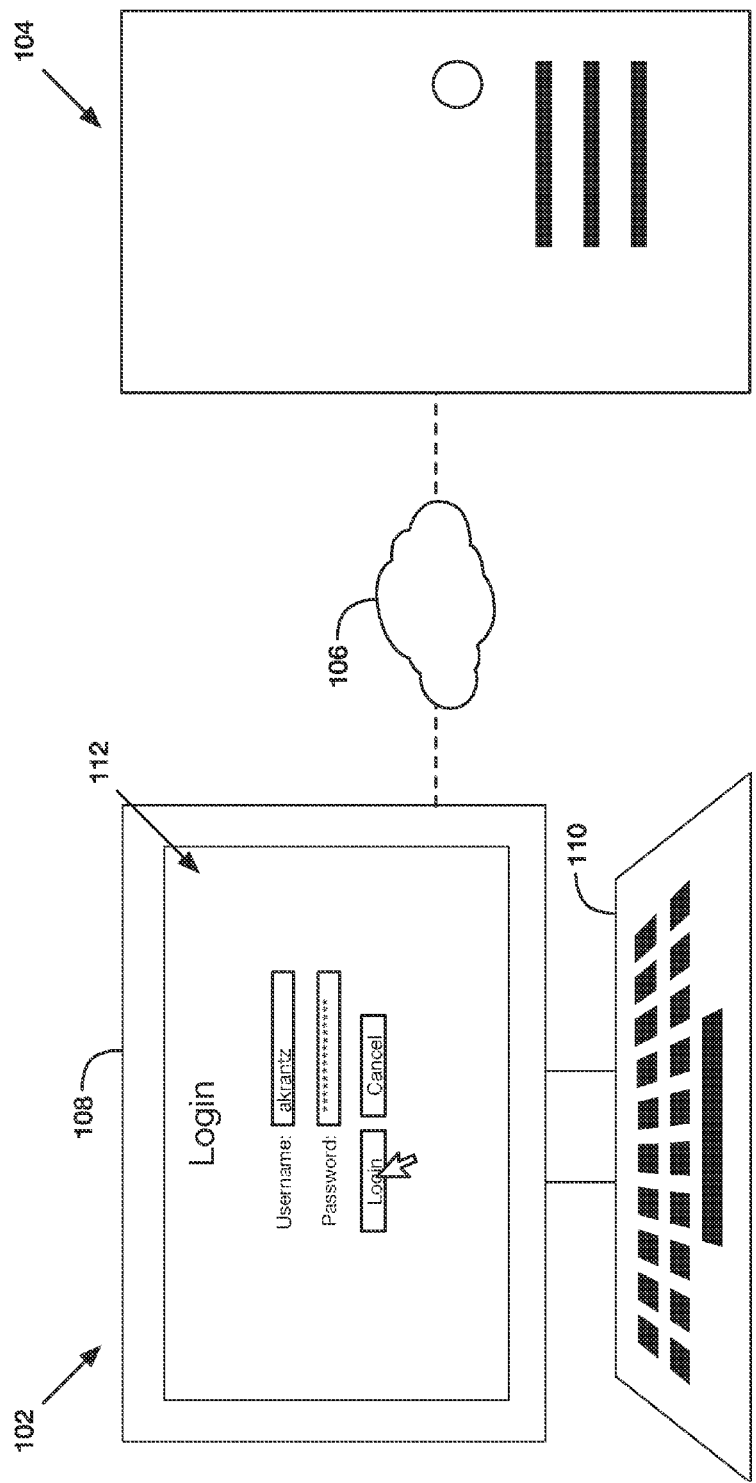
FIG. 1 illustrates respective client and server devices, in accordance with various embodiments.

FIG. 1 illustrates respective client and server devices, in accordance with various embodiments. As shown in FIG. 1, a client device 102 is communicatively connected to a server device 104 via a wide-area network (WAN) 106 (e.g., the Internet).

Client device 102 may be any device capable of performing the client-device functions described herein. In an embodiment illustrated in FIG. 1, the client device takes the form of a desktop computer that includes a computer monitor 108 and a computer keyboard 110. The computer executes a web browser that presents an interface 112 to an electronic shared-document repository via the computer monitor. Client device 102 may take other forms as well, as will be described below.

In an embodiment, the web browser of client device 102 communicates (via WAN 106) with server device 104, which may be any device capable of performing the server-device functions described herein. The server device may execute a web server, a database server, a file server, and/or various other server applications. Server device 104 may take other forms as well, as will be described below.

II. EXAMPLE REPOSITORY INTERFACE

FIGS. 2 through 15 illustrate an interface of an electronic shared-document repository, in accordance with various embodiments. The repository interface is described below as being presented via a web browser of client device 102; however, those having skill in the art will recognize that the repository interface may be presented in other ways as well.

Figure 2:
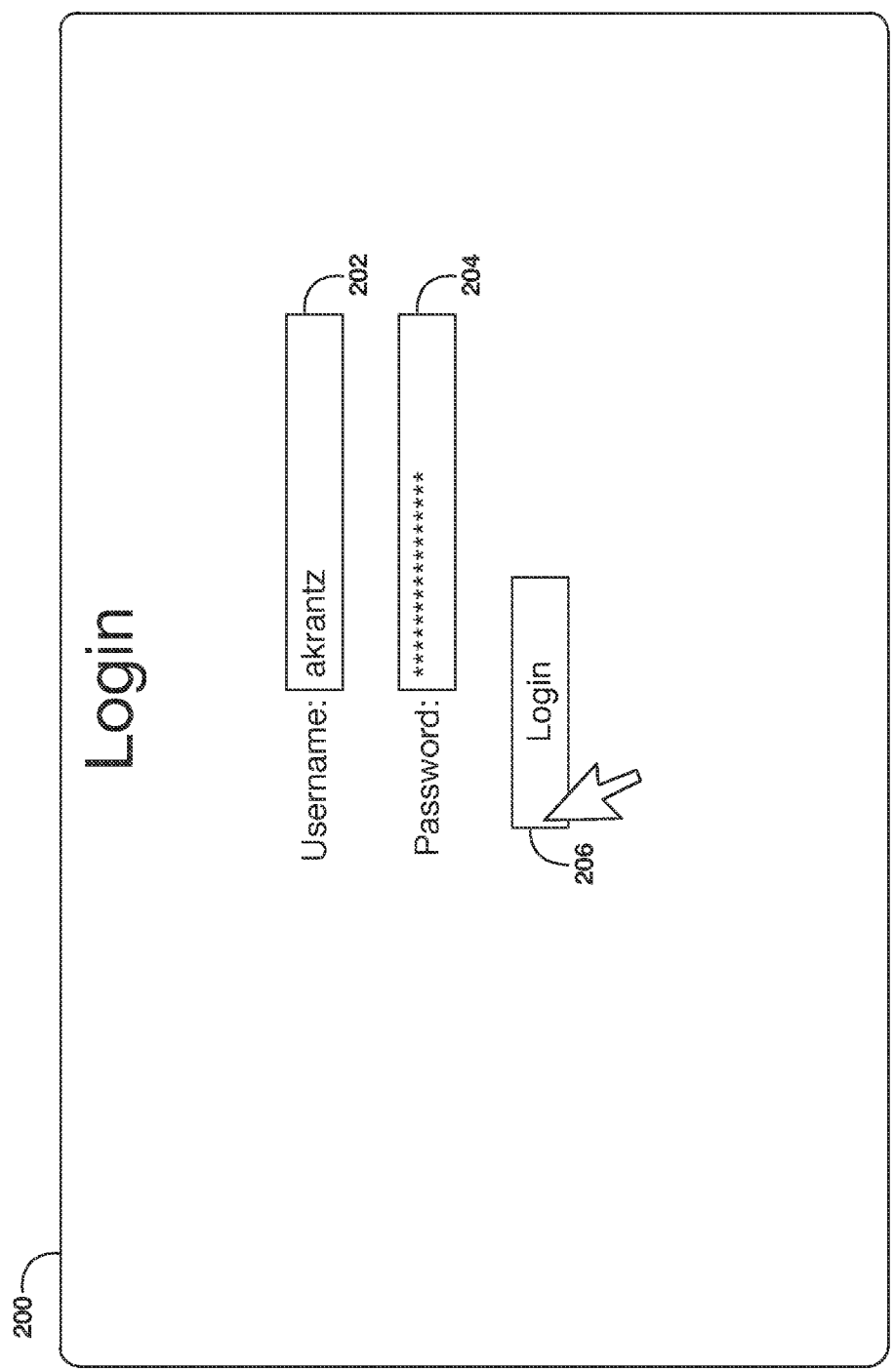
FIG. 2 illustrates a login interface, in accordance with various embodiments.

FIG. 2 illustrates a login interface, in accordance with various embodiments. As shown in FIG. 2, the login interface 200 includes a username input field 202, a password input field 204, and a login button 206. In an embodiment, the login interface is configured to receive a username and a password of a repository user via fields 202 and 204, respectively. The login interface sends the username and password to server device 104 in response to receiving a user selection of login button 206.

Figure 3:
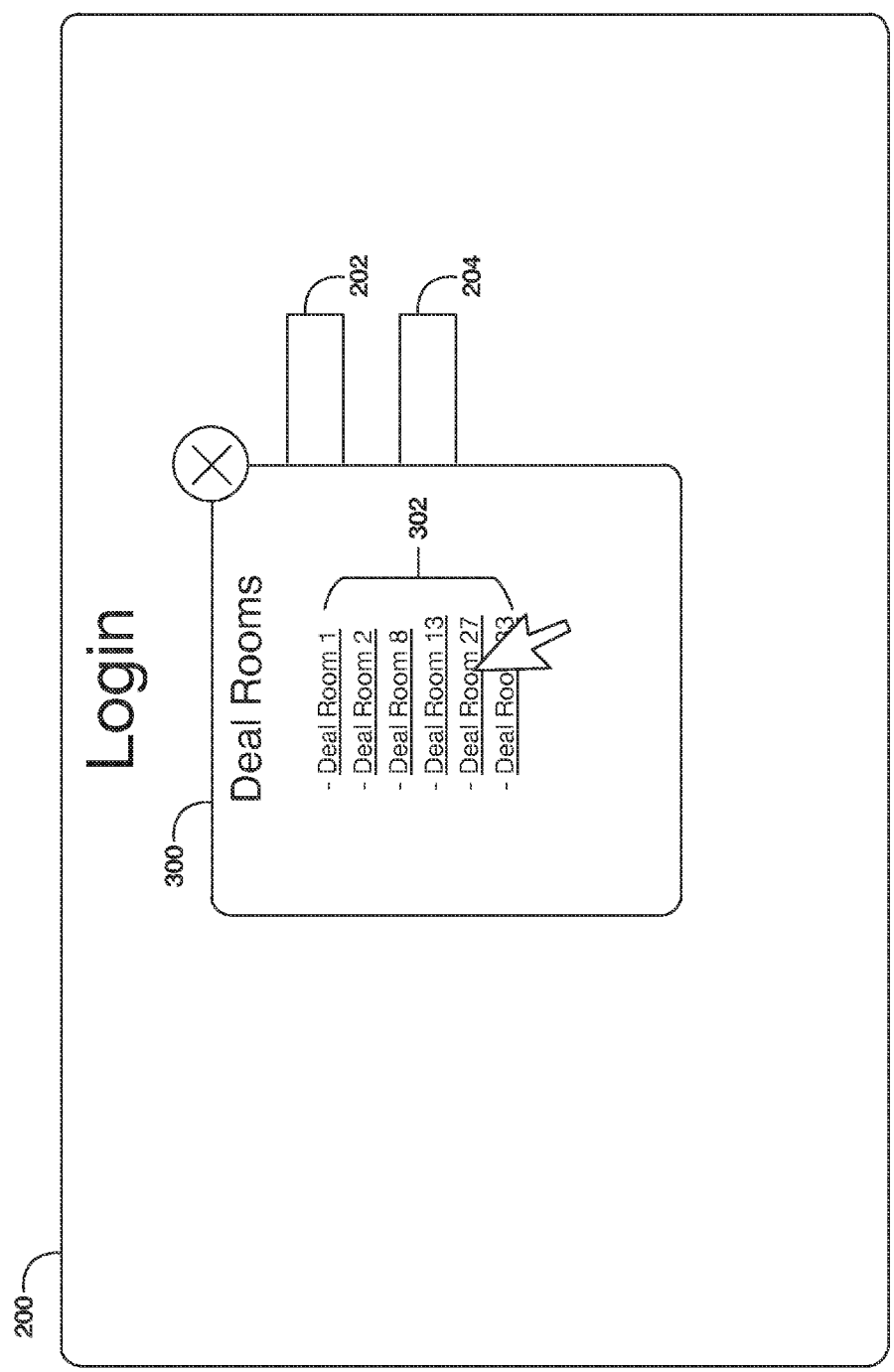
FIG. 3 illustrates a deal room selection interface, in accordance with various embodiments.

FIG. 3 illustrates a deal room selection interface, in accordance with various embodiments. The deal room selection interface 300 may be presented upon server device 104 successful authenticating the repository user (based on the username and password provided via login interface 200).

As shown in FIG. 3, the deal room selection interface 300 includes a list 302 of one or more deal rooms of the repository. In an embodiment, access to a respective deal room is restricted to a respective group of authorized users. The creator of the deal room or an administrator of the repository may specify the authorized users for a respective deal room (as examples). The group of authorized users may be specified, for example, when the deal room is initially created, and the group of authorized users may be modified after creation of the deal room, among other variations. List 302 of deal rooms may list only those rooms that the user has been authorized to access.

Figure 4:
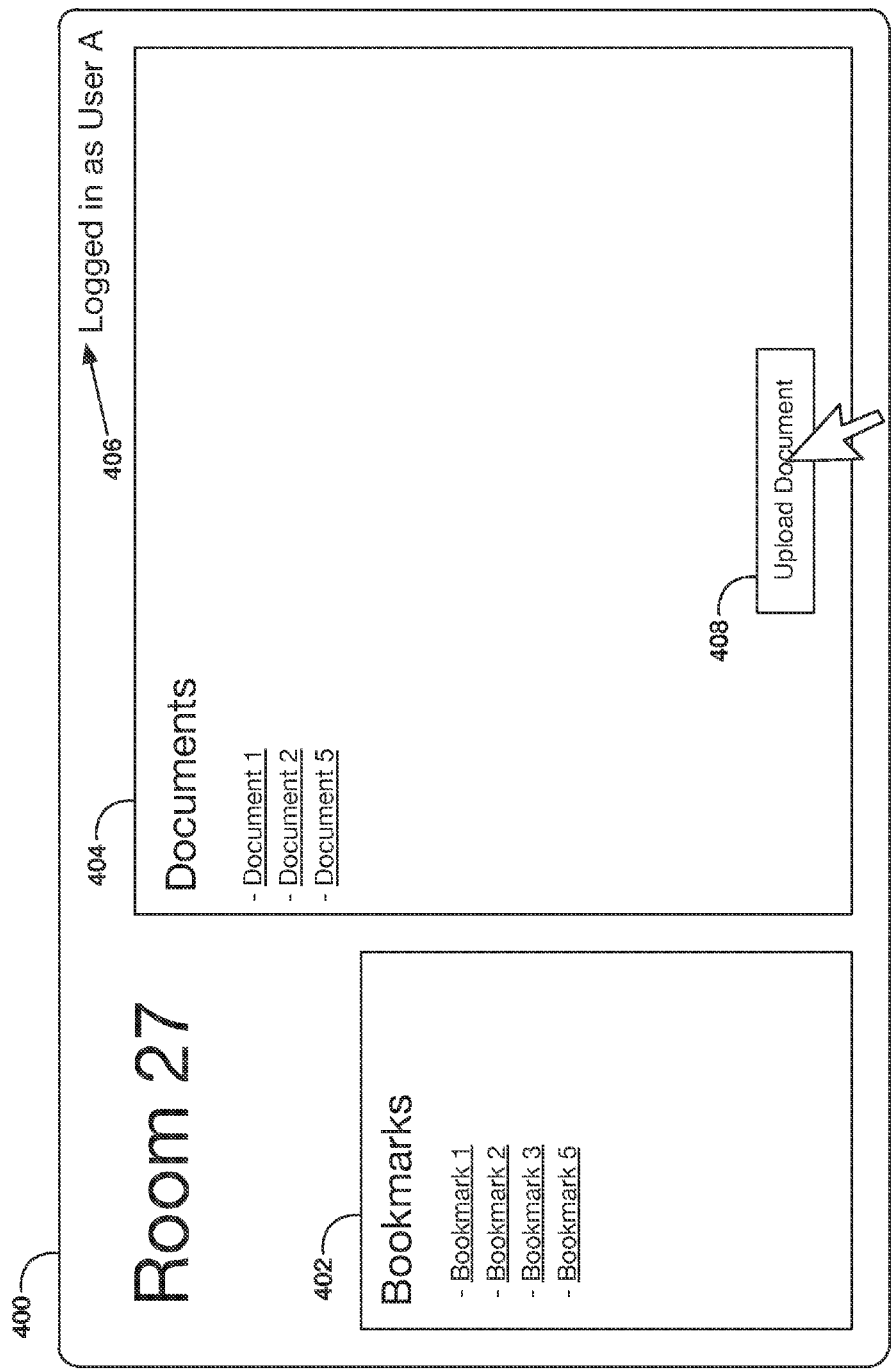
FIG. 4 illustrates a bookmark/document selection interface, in accordance with various embodiments.

FIG. 4 illustrates a bookmark/document selection interface, in accordance with various embodiments. The selection interface 400 may be presented in response to user selection of a deal room referenced in list 302. As shown in FIG. 4, the selection interface 400 includes a list of documents 402 and a list of bookmark 404. The interface further includes an indication 406 of the user that was authenticated via interface 200, as well as an upload document button 408.

Figure 5:
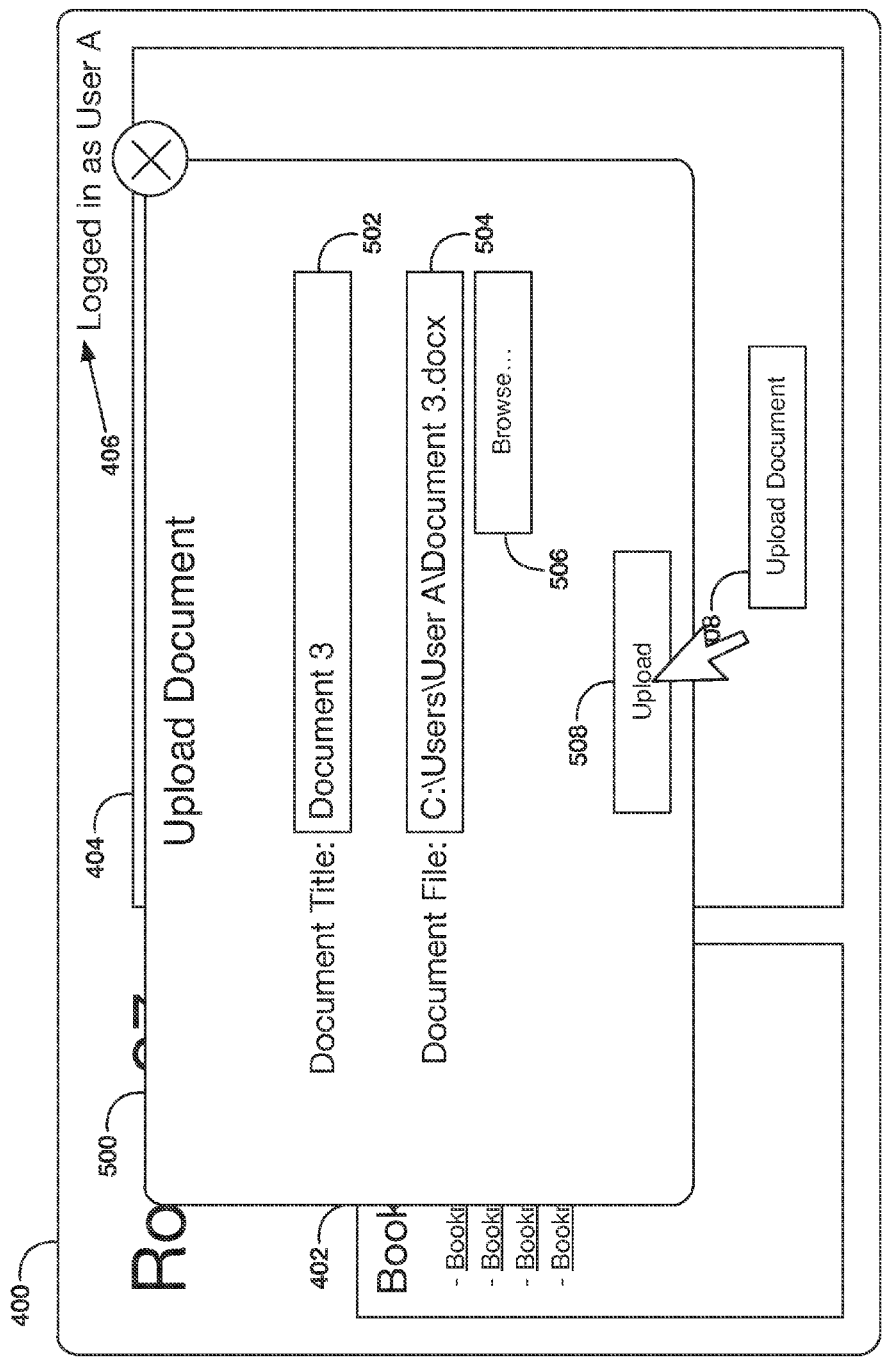
FIG. 5 illustrates a document upload interface, in accordance with various embodiments.

FIG. 5 illustrates a document upload interface, in accordance with various embodiments. The document upload interface 500 may be presented in response to user selection of upload button 408, for example. As shown in FIG. 5, the document upload interface 500 includes a document title field 502, a document file field 504, a browse button 506, and an upload button 508. In an embodiment, the upload interface is configured to receive a title and a location of a document to be uploaded to the repository via fields 502 and 504, respectively. The upload interface presents a file-selection interface in response to user selection of browse button 506 and populates document file field 504 with the location of a file selected via the file-selection interface. The upload interface sends both the specified title and the document present at the specified location to server device 104 in response to receiving a user selection of upload button 508.

Figure 6:
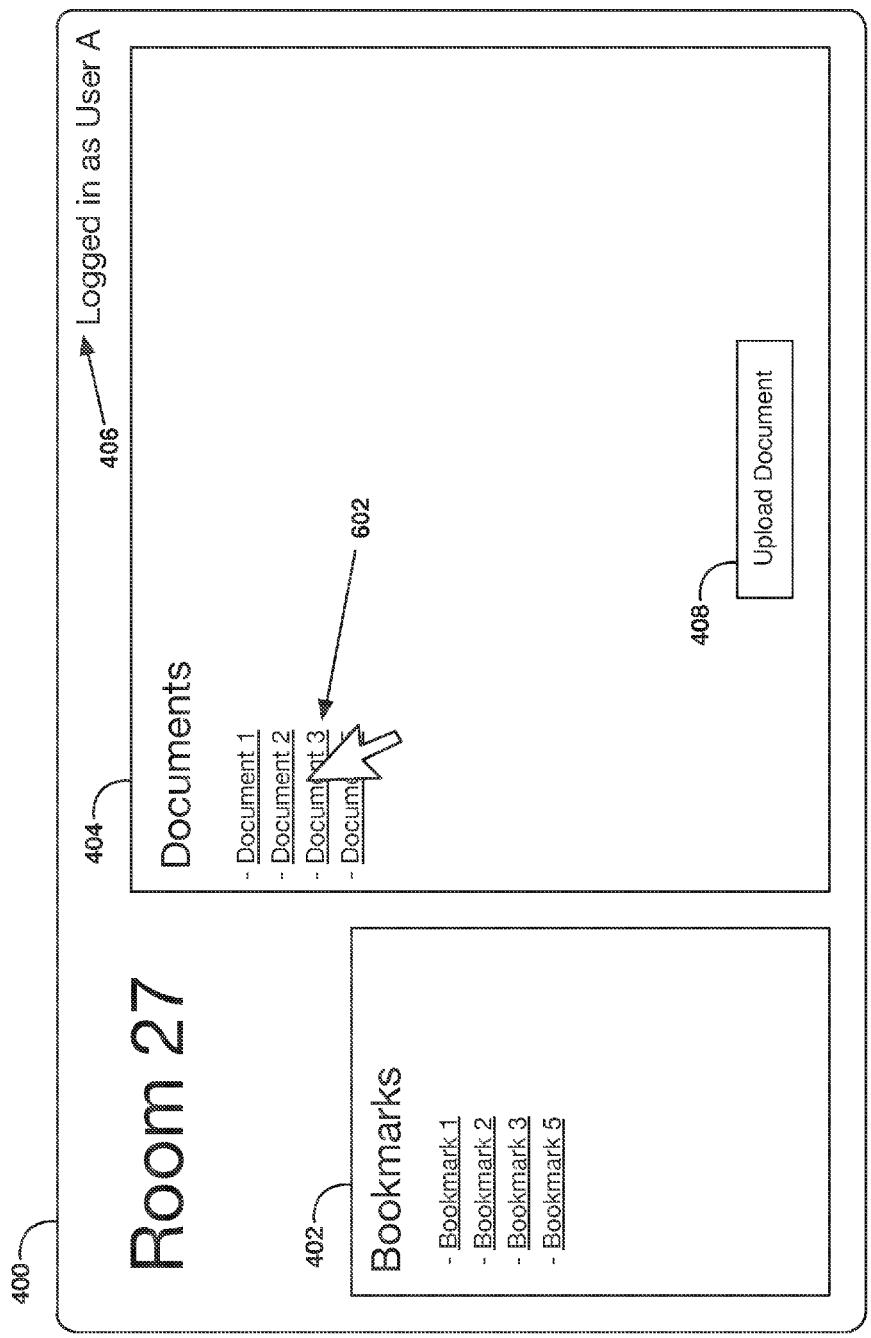
FIG. 6 illustrates the bookmark/document selection interface after upload of a document via the document upload interface of FIG. 5, in accordance with various embodiments.

FIG. 6 illustrates the bookmark/document selection interface after upload of a document via the document upload interface, in accordance with various embodiments. As shown in FIG. 6, document list 404 includes a reference 602 to the document uploaded via document upload interface 500.

Figure 7:
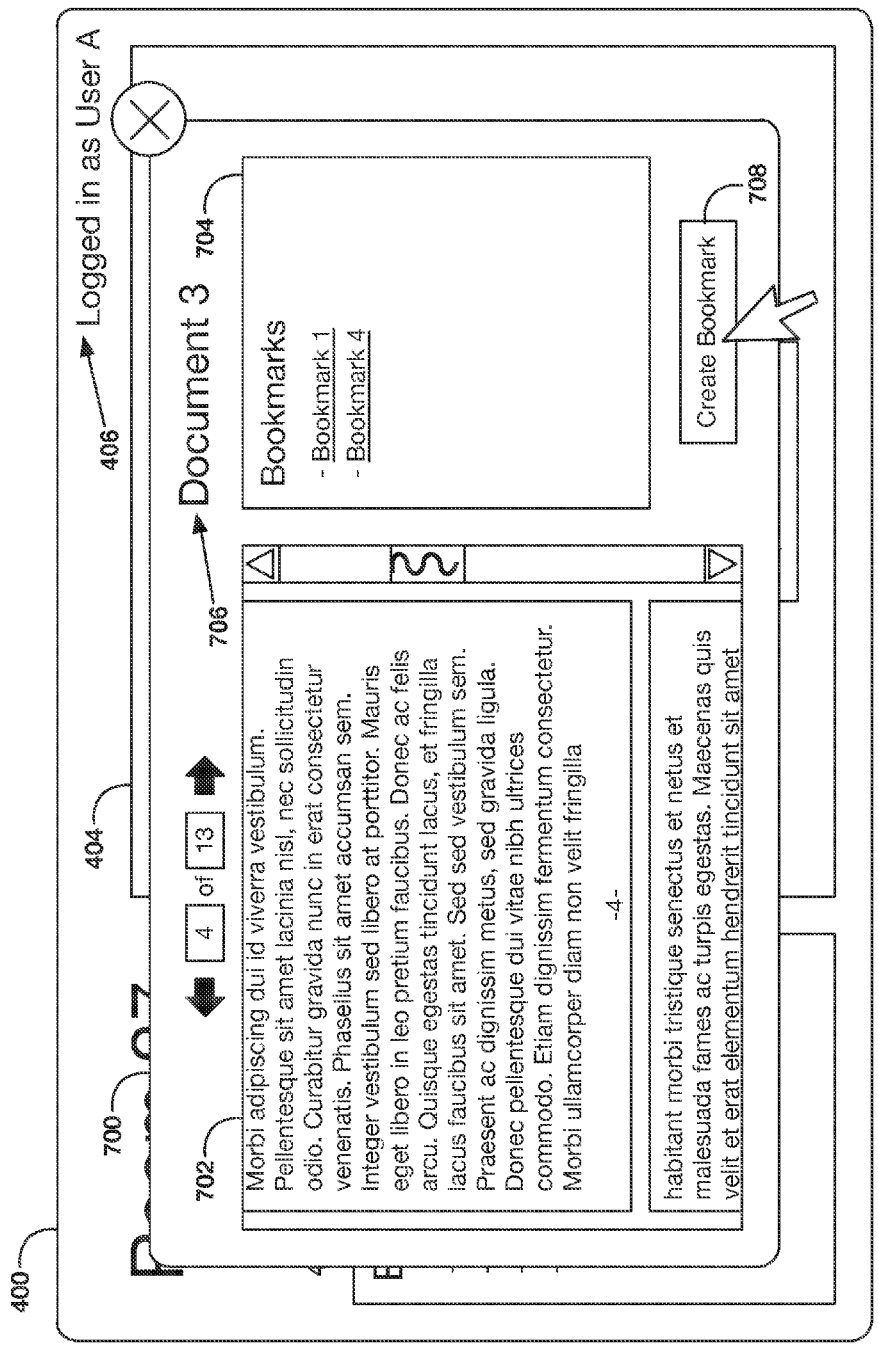
FIG. 7 illustrates a document presentation interface, in accordance with various embodiments.

FIG. 7 illustrates a document presentation interface, in accordance with various embodiments. The document presentation interface 700 may be presented in response to user selection of a reference to a bookmark and/or a document in respective lists 402 and 404, for example. In the embodiment illustrated in FIG. 7, the document presentation interface is presented in response to user selection of reference 602 to document 3 presented in list 404.

As shown in FIG. 7, the document presentation interface 700 includes a presentation 702 of a respective document and a list of bookmarks 704 associated with respective locations in the document. The interface further includes a header 706 identifying the presented document, as well as a create bookmark button 708.

Figure 8:
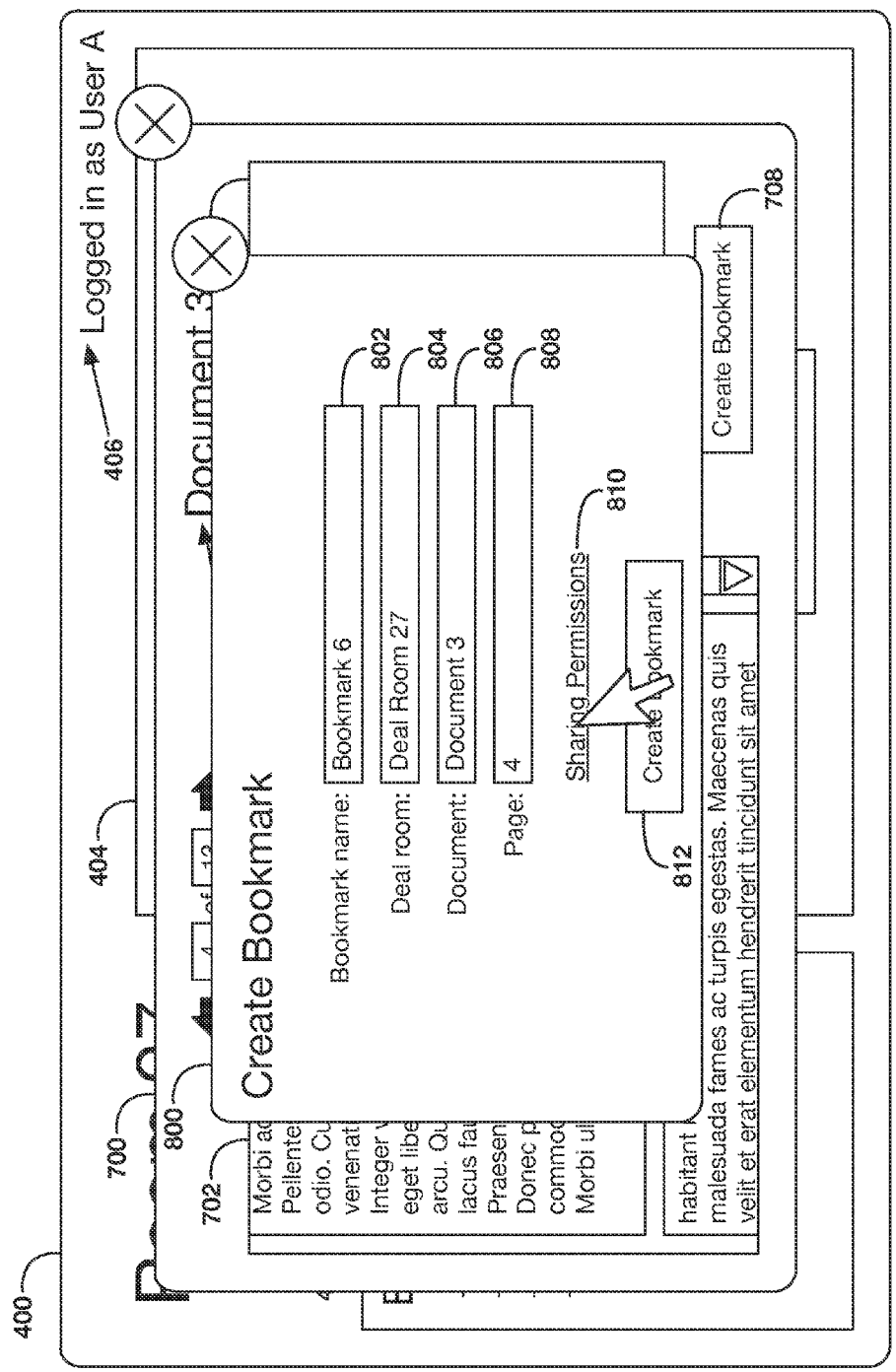
FIGS. 8 and 10 illustrate a bookmark creation interface, in accordance with various embodiments.

FIG. 8 illustrates a bookmark creation interface, in accordance with various embodiments. The bookmark creation interface 800 may be presented in response to user selection of create bookmark button 708, for example. As shown in FIG. 8, bookmark creation interface 800 includes a bookmark name field 802, a deal room field 804, a document field 806, and a page field 808. The interface further includes a permissions hyperlink 810 and a create button 812.

In an embodiment, the bookmark creation interface is configured to receive a bookmark name and an identifier of a repository deal room via fields 802 and 804, respectively. The bookmark creation interface is further configured to receive an identifier of a repository document and a reference to a location in that repository document via fields 806 and 808, respectively. The identifiers of the deal room and the document could be the respective names of the room and document, for example. The identifiers could take other forms as well. Fields 804 and 806 could be automatically populated with the identifiers of the deal room selected via deal room selection interface 300 and the document selected via bookmark/document selection interface 400, respectively. Additionally or alternatively, fields 804 and 806 could receive user entry of the deal room identifier and/or the document identifier. Field 808 could be automatically populated with the location in the document presented via document presentation interface 700 at the time of user selection of create bookmark button 708. As another possibility, field 808 could receive user entry of a respective location in the presented document.

Figure 9:
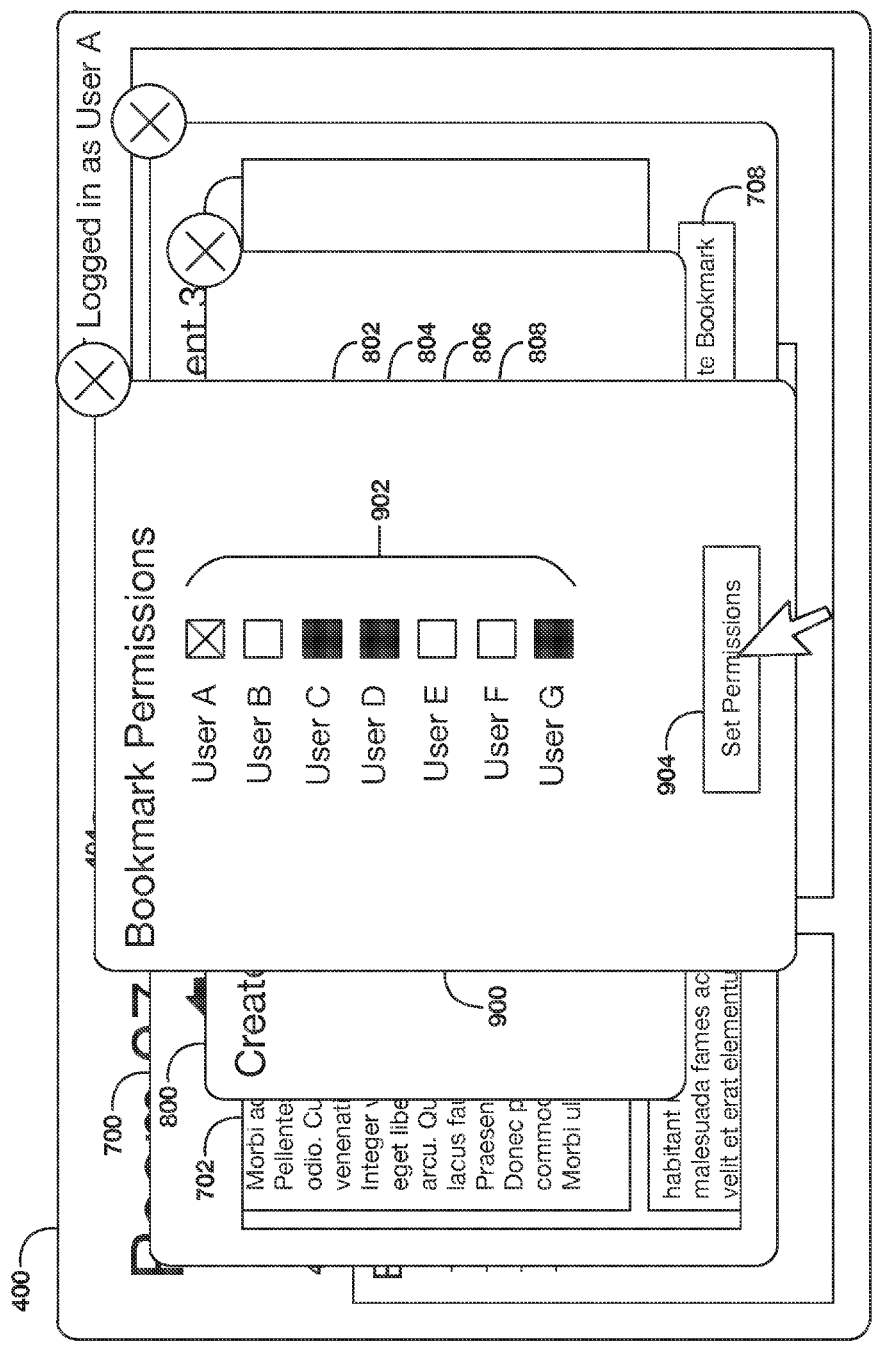
FIG. 9 illustrates a bookmark permission assignment interface, in accordance with various embodiments.

FIG. 9 illustrates a bookmark permission assignment interface, in accordance with various embodiments. The bookmark permission assignment interface 900 may be presented in response to user selection of permissions hyperlink 810, for example. As shown in FIG. 9, bookmark permission assignment interface 900 includes a list of users 902 of the electronic shared-document repository and respective checkboxes next to each listed user. Interface 900 further includes a set permissions button 904. A respective checkbox may be configured to receive user selection of the given checkbox and to responsively toggle both (i) selection of the respective user indicated next to the respective checkbox and (ii) presentation of a solid black box in the respective checkbox. Interface 900 may require selection of one or more users—e.g., the user that is attempting to create a bookmark. The interface may automatically make the required selections and may indicate, e.g., by presentation of a checkmark in the checkbox next to the respective user (such as the checkmark in FIG. 9 next to user A attempting to create the bookmark), that the required selections have been made.

Figure 10:
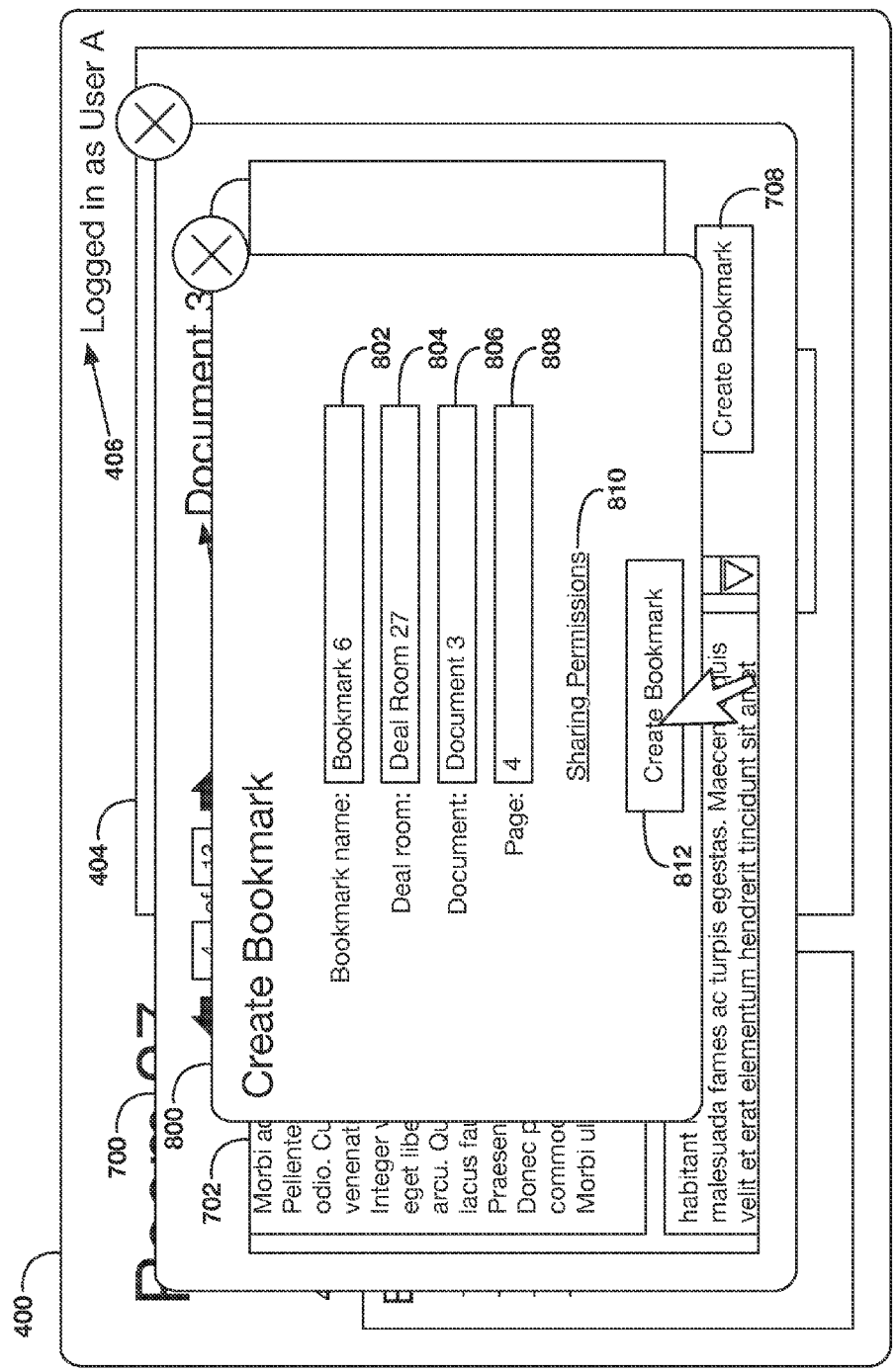

FIG. 10 illustrates bookmark creation interface 800 as presented in response to detecting user selection of set permissions button 904. Interface 900 may be configured to send a request to server device 104 to create a bookmark in response to detecting user selection of create bookmark button 812. The request may include the received (or auto-populated) values of one or more of fields 802 through 808, as well as respective value indicating respective users selected via permission assignment interface 900. In response to receiving the request, server device 104 may create a bookmark based on the values in the received request.

Figure 11:
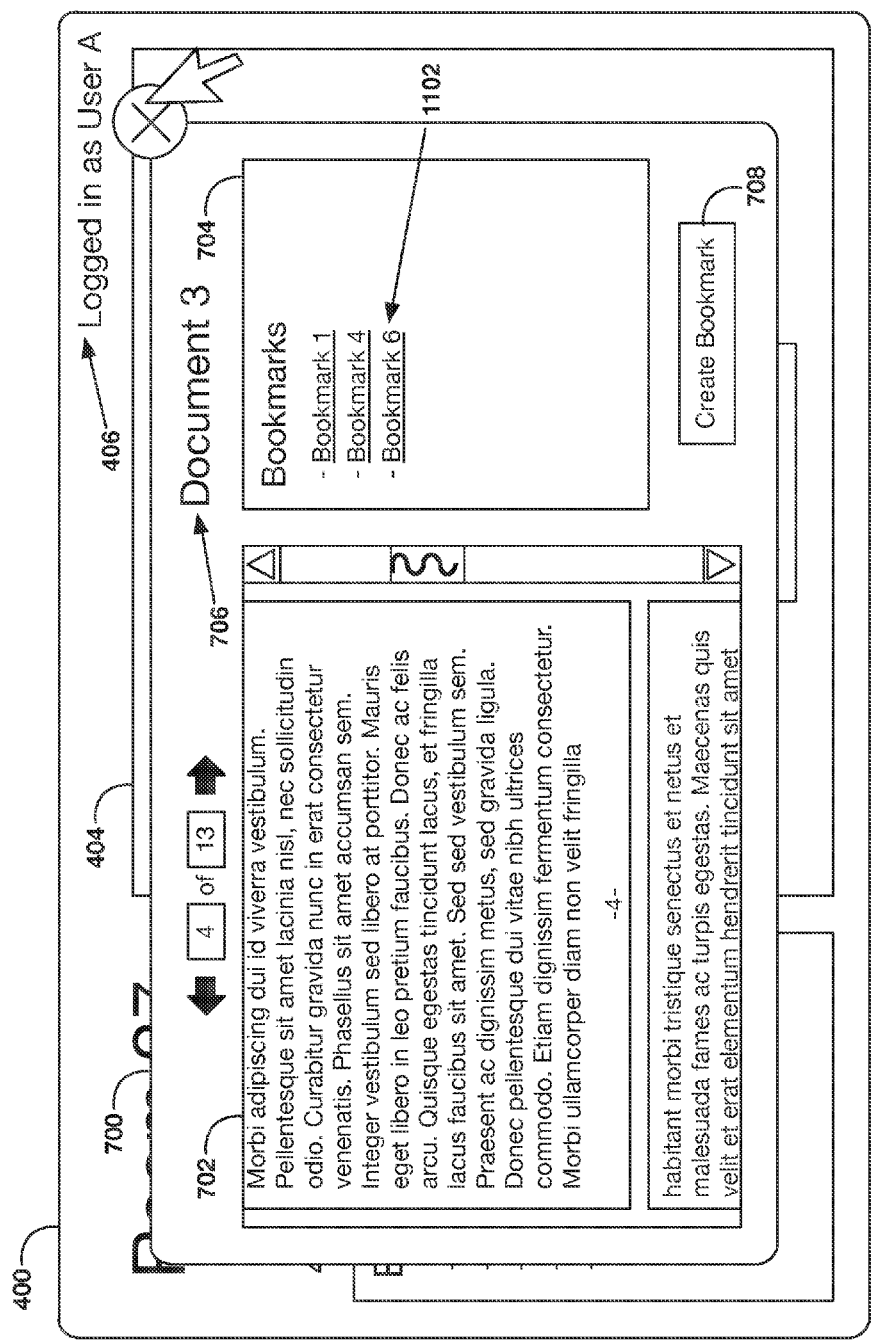
FIG. 11 illustrates the document presentation interface of FIG. 7 after creation of a bookmark, in accordance with various embodiments.
Figure 12:
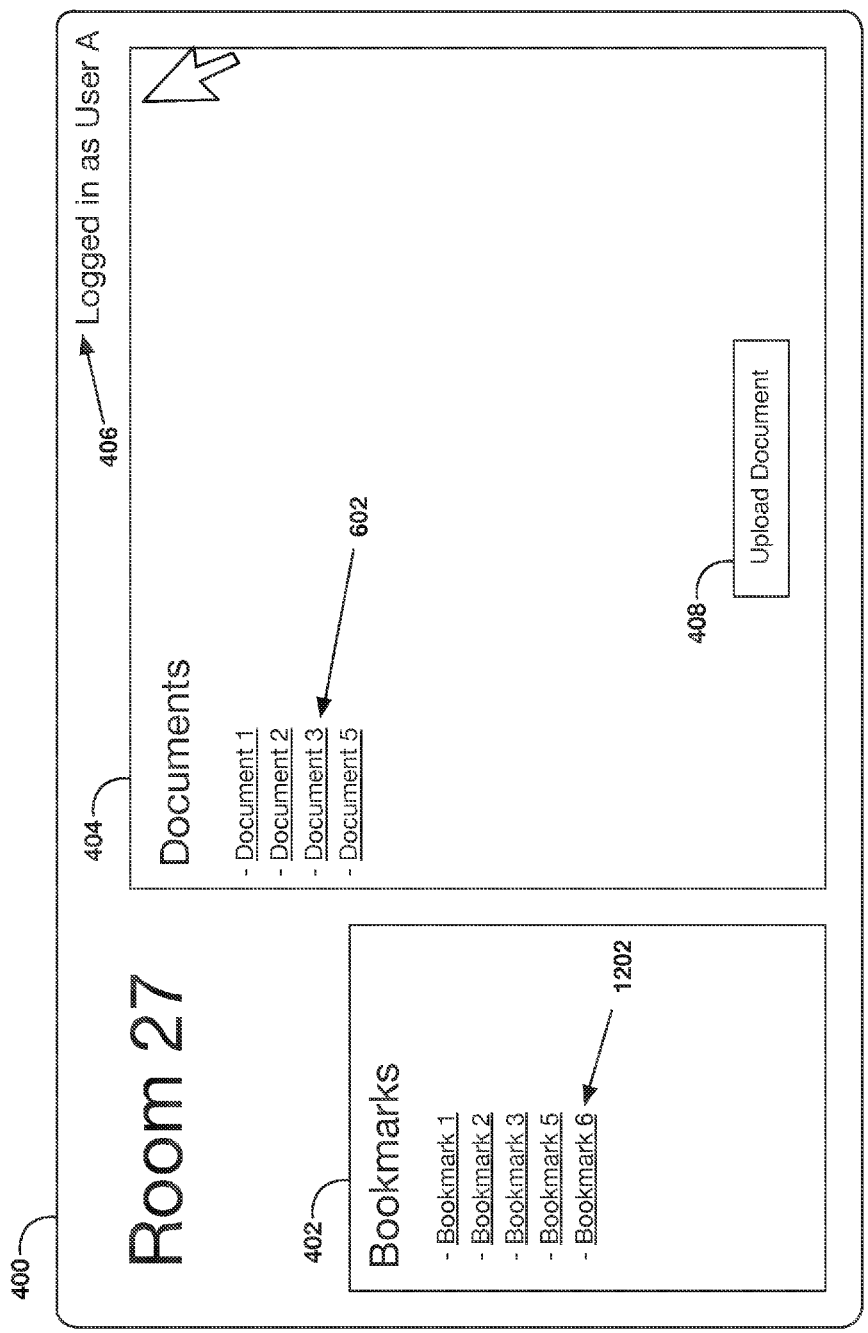
FIG. 12 illustrates a bookmark/document selection interface after creation of a bookmark, in accordance with various embodiments.

FIGS. 11 and 12 illustrate the document presentation interface and the bookmark/document selection interface, respectively, after creation of a bookmark, in accordance with various embodiments. As shown in FIG. 11, document presentation interface 800 includes a reference 1102 to the bookmark created via bookmark creation interface 800. As shown in FIG. 12, document presentation interface 800 includes a reference 1202 to the bookmark created via bookmark creation interface 800.

Figure 13:
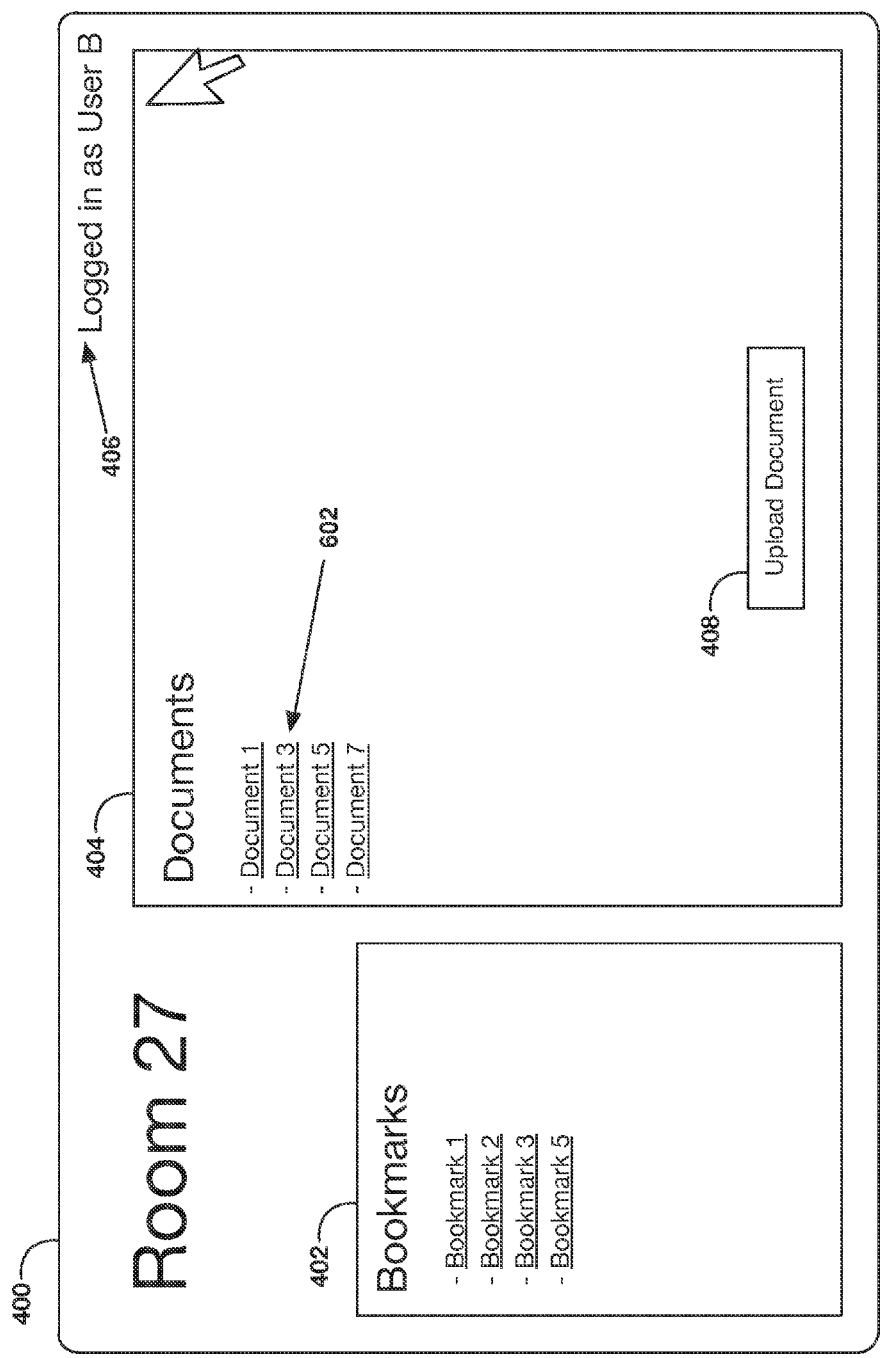
FIG. 13 illustrates a bookmark/document selection interface for a second user of the electronic-document repository, in accordance with various embodiments.

FIG. 13 illustrates a bookmark/document selection interface for a second user B of the electronic-document repository, in accordance with various embodiments. As illustrated in FIG. 13, a user B has been authenticated to the electronic shared-document repository (as shown by indication 406). Document list 404 includes reference 602 to document 3 uploaded by user A via document upload interface 500. However, bookmark list 402 does not include reference 1202 to bookmark 6 because, as shown in FIG. 9, user B was not selected in bookmark permission assignment interface 900 when bookmark 6 was created via bookmark creation interface 800.

Figure 14:
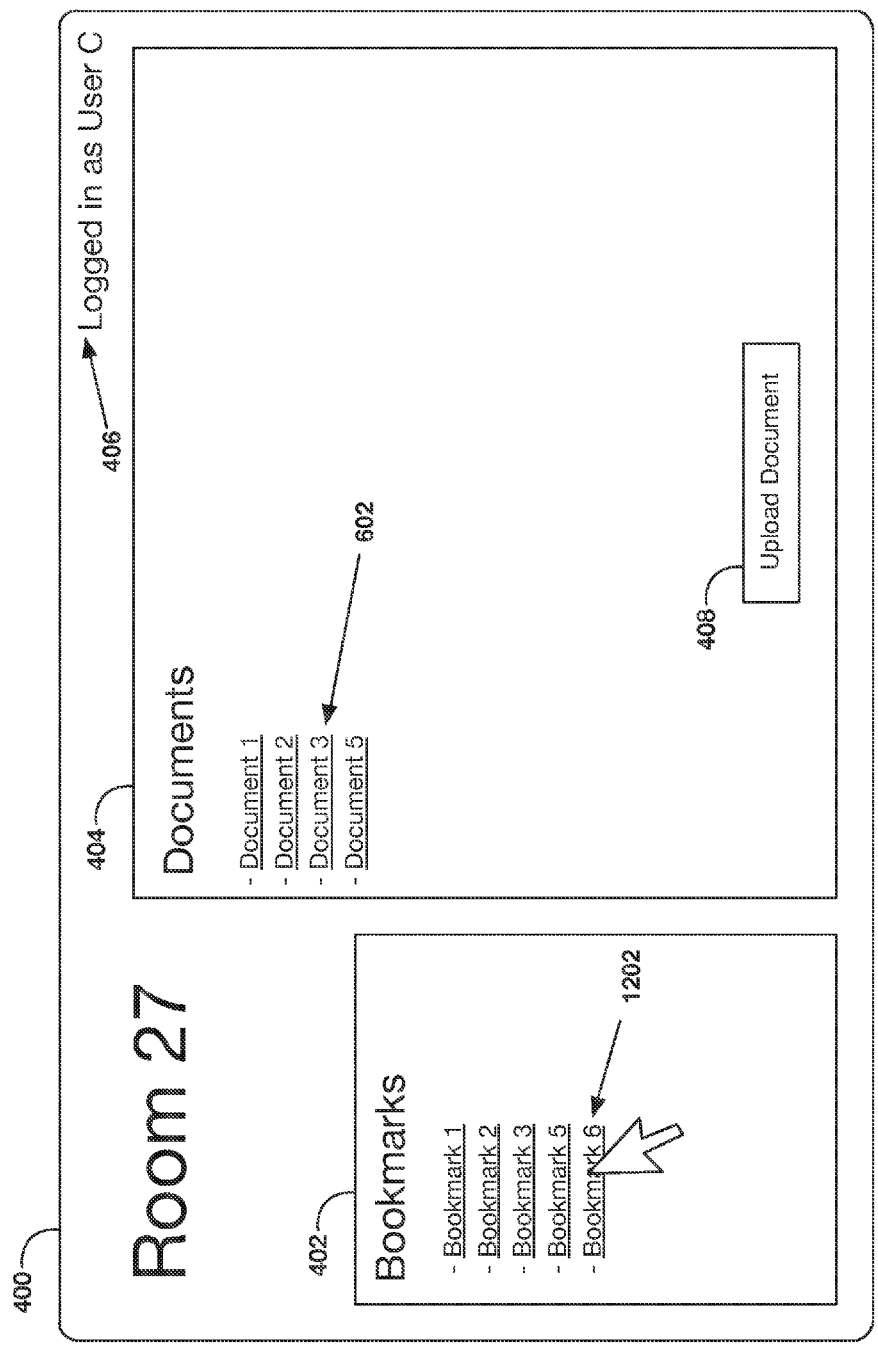
FIG. 14 illustrates a bookmark/document selection interface for a third user of the electronic-document repository, in accordance with various embodiments.

FIG. 14 illustrates a bookmark/document selection interface for a third user C of the electronic-document repository, in accordance with various embodiments. As illustrated in FIG. 14, a user C has been authenticated to the electronic shared-document repository (as shown by indication 406), and document list 404 includes reference 602 to document 3 uploaded by user A via document upload interface 500. As shown in FIG. 9, user C was selected in bookmark permission assignment interface 900 when bookmark 6 was created via bookmark creation interface 800. Accordingly, unlike the bookmark list presented to user B, bookmark list 402 presented to user C includes reference 1202 to bookmark 6.

Figure 15:
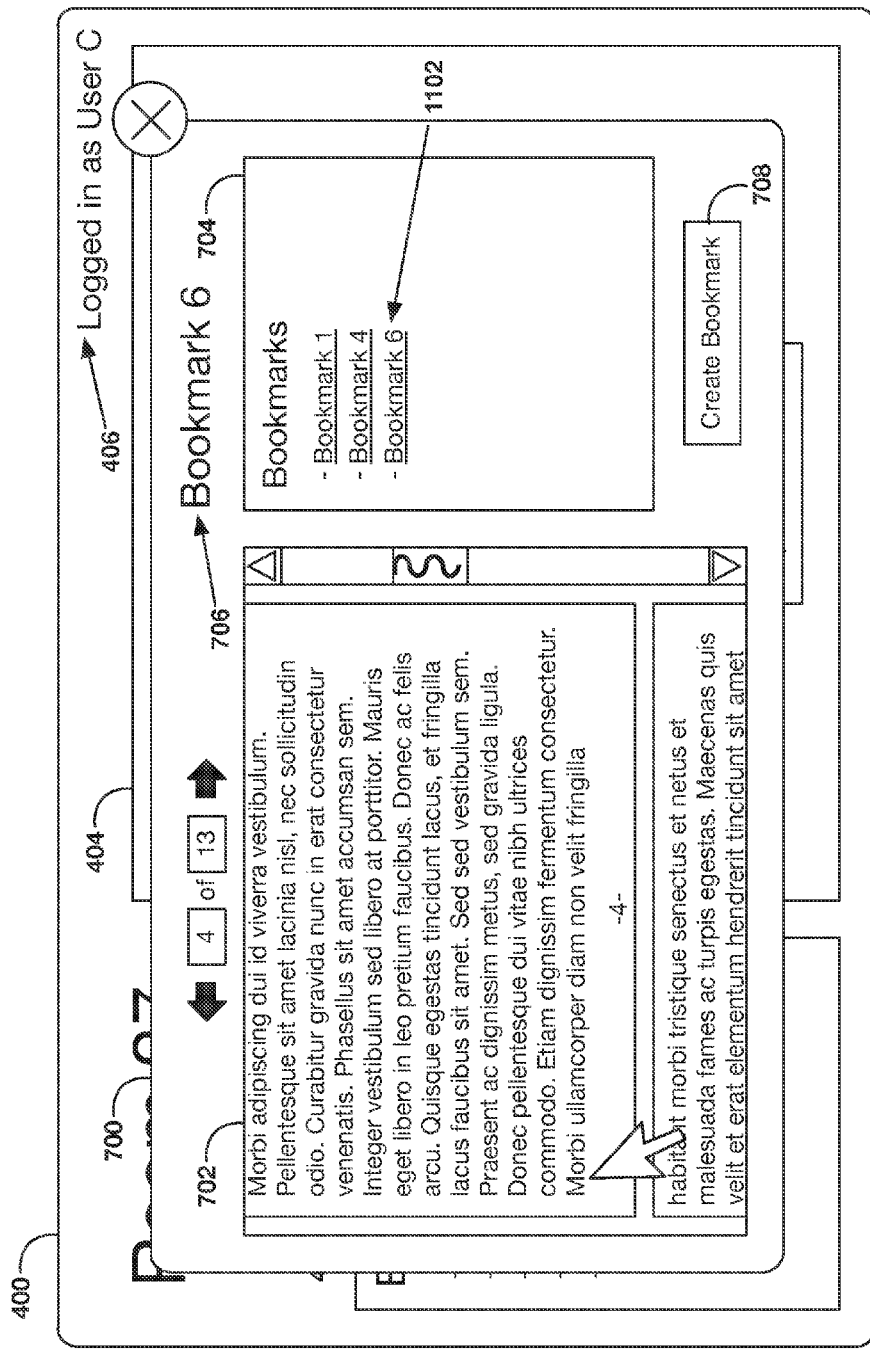
FIG. 15 illustrates the document presentation interface of FIG. 7 after user selection of a bookmark reference, in accordance with various embodiments.

FIG. 15 illustrates document presentation interface 700 after user selection of reference 1202 to bookmark 6, in accordance with various embodiments. As shown in FIG. 15, header 706 identifies the content of presentation 702 as bookmark 6. Document 6 is presented in presentation 702 at the location associated with bookmark 6—namely, page 4.

III. EXAMPLE ARCHITECTURE

Figure 16:
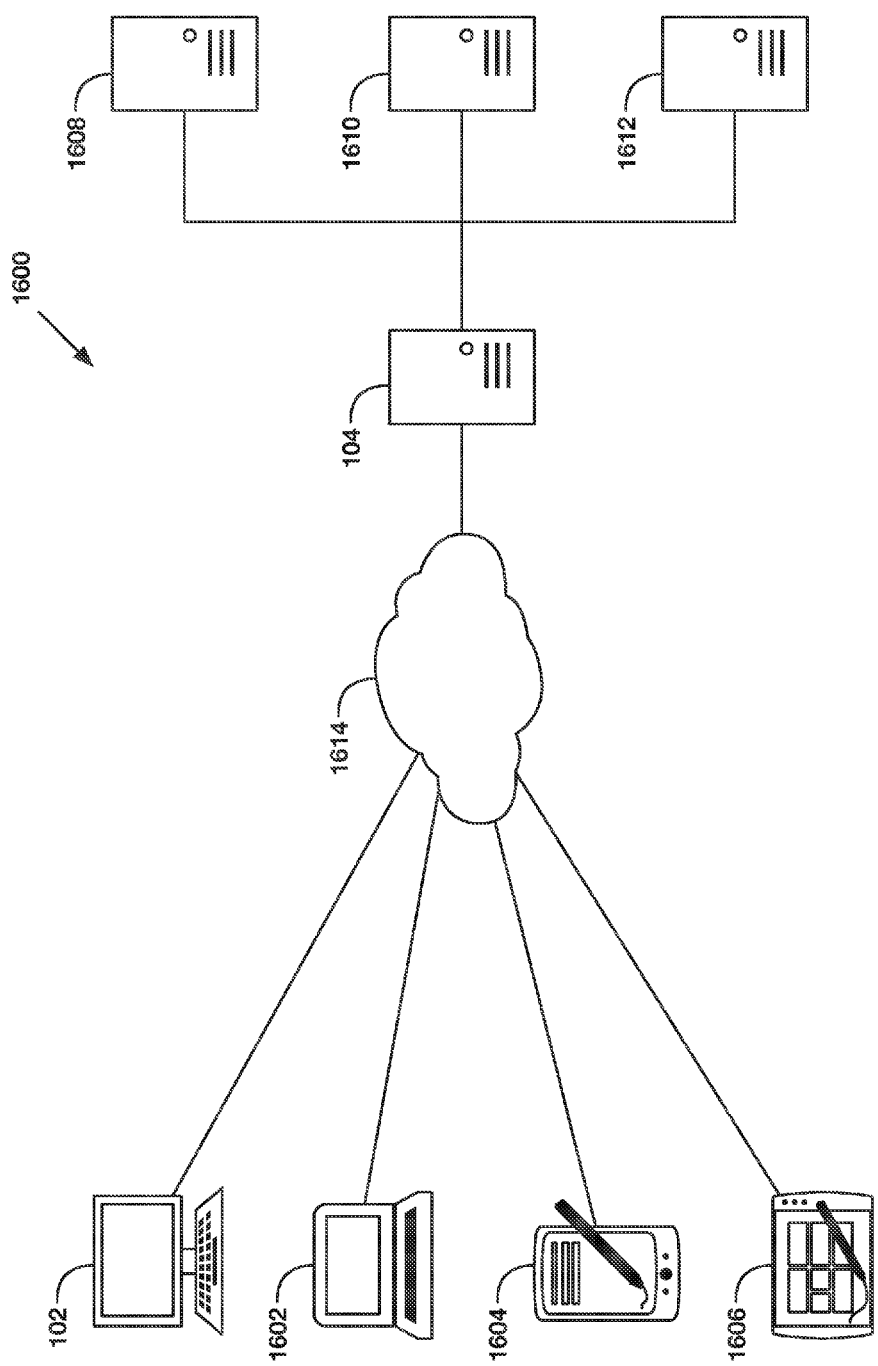
FIG. 16 illustrates a computer network, in accordance with various embodiments.

FIG. 16 illustrates a computer network, in accordance with various embodiments. As shown in FIG. 16, network 1600 includes client devices 102 and 1602 through 1606, server devices 104 and 1608 through 1612, and the Internet 1614. The client devices are connected to the Internet 1614 via respective communication links and server device 104 is connected to the Internet 1614 via a respective communication link. Server devices 104 and 1608 through 1612 are interconnected via respective communication links.

Client devices 102 and 1602 through 1606 could be any devices capable of performing the client-device functions described herein. A respective client device may execute an operating system such as Microsoft Windows, Apple OS X, Linux, Apple iOS, and/or Google Android, as just a few examples. A user interface for a respective client device could be provided via a web browser such as Microsoft Internet Explorer, Google Chrome, Mozilla Firefox, and/or Apple Safari. As illustrated in FIG. 16, a respective client device could take the form of a desktop computer, a laptop computer, a tablet computer, and/or a personal digital assistant (PDA), among numerous other possibilities. An example client device is described below with reference to FIG. 18.

Server devices 104 and 1608 through 1612 may be any server devices capable of performing the server-device functions described herein. A respective server device may execute an operating system such as IBM z/OS, BSD (such as FreeBSD, NetBSD, and OpenBSD), Oracle Solaris (previously Sun Solaris), and/or any of the operating systems listed above with reference to the above-described client devices, among numerous other possibilities. A respective server device could function as a database server, a file server, a mail server, a web server, and/or an application server, as just a few examples.

In an embodiment, server device 104 functions as a web server and/or a proxy server, and one or more of server devices 1608 through 1612 function as a database server and/or a file server. Server device 104 retrieves one or more bookmarks and/or documents from one or more of server devices 1608 through 1612. Server device 104 then provides a bookmark object and/or a bookmarked-document object to client device 102 based on the received bookmarks/documents.

The respective communication links may be any links capable of performing the communication-link functions described herein. The communication links may be a combination of hardware and/or software, perhaps operating on one or more communication-link layers such as one or more physical, network, transport, and/or application layers. In an embodiment, one or more of the communication links facilitate communication over a local-area network between server devices 104 and 1608 through 1612. In an embodiment, one or more of the communication links facilitate communication over a wide-area network (such as the Internet) between server device 104 and respective client devices 102 and 1602 through 1606.

Figure 17:
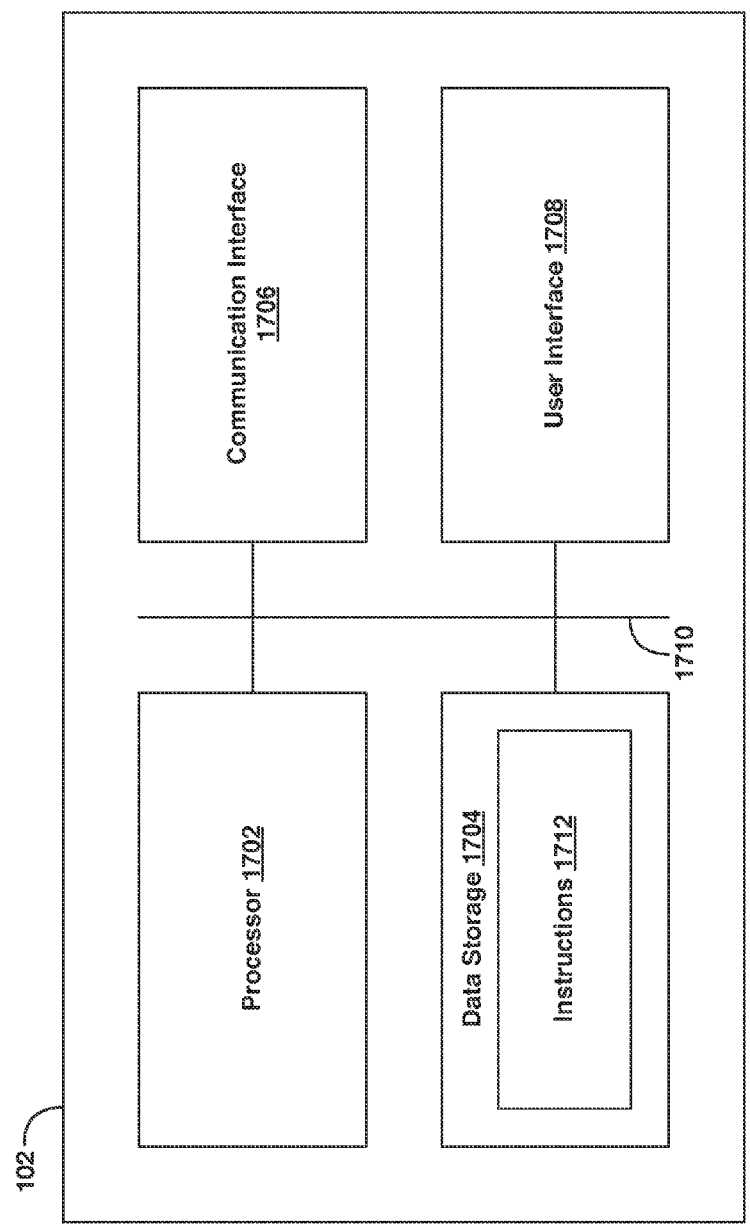
FIG. 17 is a block diagram of the hardware a client device, in accordance with various embodiments.

FIG. 17 is a block diagram of a client device, in accordance with various embodiments. As shown in FIG. 17, client device 102 includes a processor 1702, a data storage 1704, a communication interface 1706, and a user interface 1708, each of which are interconnected via a system bus 1710. Those having shill in the art will appreciate that client device 102 may include additional and/or different components.

Processor 1702 may take the form of one or more general-purpose processors and/or one or more special-purpose processors, and may be integrated in whole or in part with data storage 1704, communication interface 1706, and/or user interface 1708 (among other components). Data storage 1704 may store instructions 1712, received repository data (such as received bookmark objects and bookmarked-document objects), and/or user-interface data, among numerous other possibilities. The data storage may take the form of a non-transitory computer-readable medium such as a hard drive, a solid-state drive, an EPROM, a USB storage device, a CD-ROM disk, a DVD disk, a relational database management system (RDBMS), any other non-volatile storage, or any combination of these, to name just a few examples. In an embodiment, instructions 1712 comprise machine-language instructions executable by processor 1702. In an embodiment, instructions 1712 comprise script instructions as well as machine-language instructions for an interpreter; the machine-language interpreter instructions are executed by the processor, and the interpreter instructions in turn performs the actions specified in the script instructions. Those having skill in the art will recognize that instructions 1712 may take other forms as well.

Communication interface 1706 may be any component capable of performing the communication-interface functions described herein. As such, the communication interface could include or take the form of an Ethernet, Wi-Fi, Bluetooth, and/or universal serial bus (USB) interface, among many other possibilities.

User interface 1708 may be any component capable of carrying out the user-interface functions described herein. The user interface may be configured to both receive input from a user and output information to the user. User input might be achieved via a keyboard, a mouse, or another component communicatively linked to a general-purpose computer. As another possibility, input may be realized via a touchscreen display of a smartphone or tablet device. Output may be provided via a computer monitor or a loudspeaker (such as a computer speaker), again possibly communicatively linked to a general-purpose computer. Some components may provide for both input and output, such as the aforementioned touchscreen display. In an embodiment, the user interface is configured to receive input and provide output via a remote-desktop session: input provided by a user at a remote computer is received by the user interface (perhaps via communication 1706), and output is sent to the remote computer for display to the user. Those having skill in the art will understand that user interface 1708 may take numerous other forms as well.

Bus 1710 may be any component(s) capable of performing the bus functions described herein. In an embodiment, the bus is any component(s) configured to transfer data between processor 1702, data storage 1704, communication interface 1706, user interface 1708, and/or any one or more other components that are part of client device 102. In an embodiment, bus 1710 includes a traditional computer bus as is known in the art. In other embodiments, bus 1710 includes a serial RS-232 communication link, a universal serial bus (USB) communication link, and/or an Ethernet communication link, alone or in combination with a traditional computer bus, among numerous other possibilities. Those having skill in the art will recognize that bus 1710 may take various other forms as well.

Figure 18:
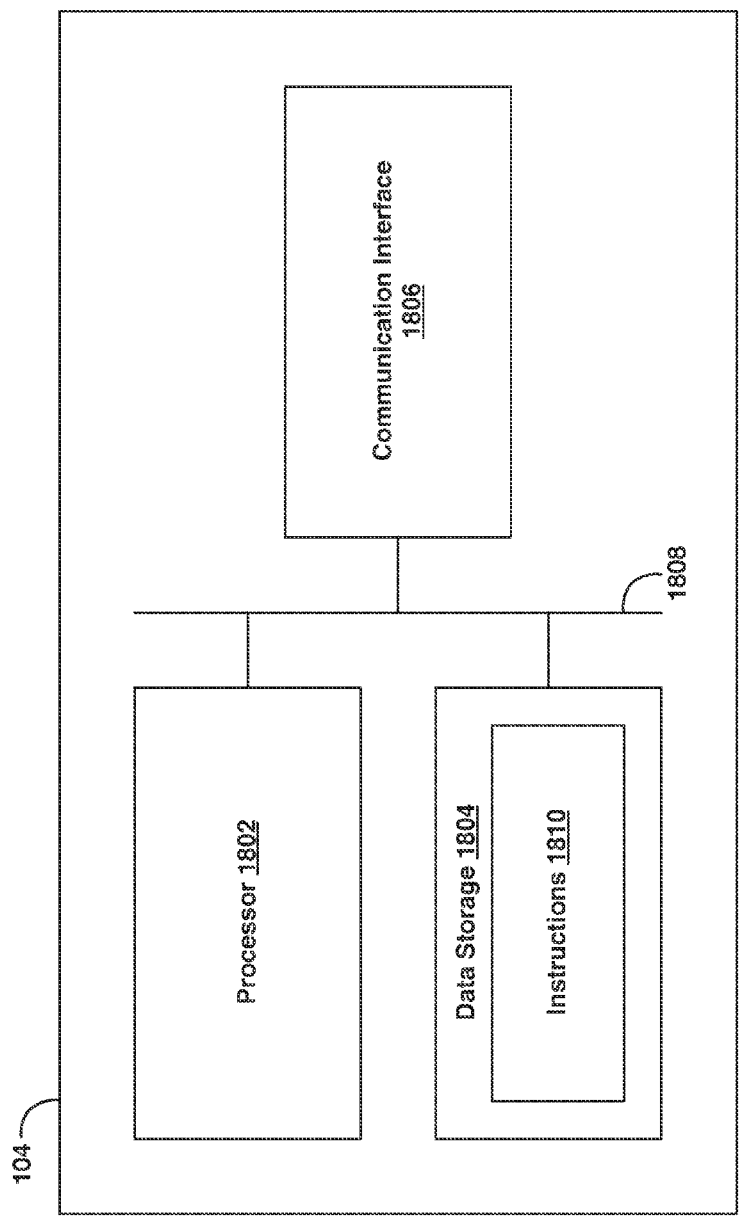
FIG. 18 is a block diagram of the hardware of a server device, in accordance with various embodiments.

FIG. 18 is a block diagram of a server device, in accordance with various embodiments. As shown in FIG. 18, server device 104 includes a processor 1802, a data storage 1804 having instructions 1810, and a communication interface 1806, each of which are interconnected via a system bus 1808. Any of processor 1802, data storage 1804, communication interface 1806, and system bus 1808 may (though needn't necessarily) take a form similar (or identical) to processor 1702, data storage 1704, communication interface 1706, and system bus 1710, respectively. Data storage 1804 may store documents, bookmarks, user-permission information, and/or deal-room information, among numerous other possibilities. Document, bookmarks, etc. may be received from another service device (such as a server device that includes a relational database management system), perhaps via communication interface 1806. Those having shill in the art will appreciate that server device 104 may include additional and/or different components.

IV. EXAMPLE OPERATION

Figure 19:
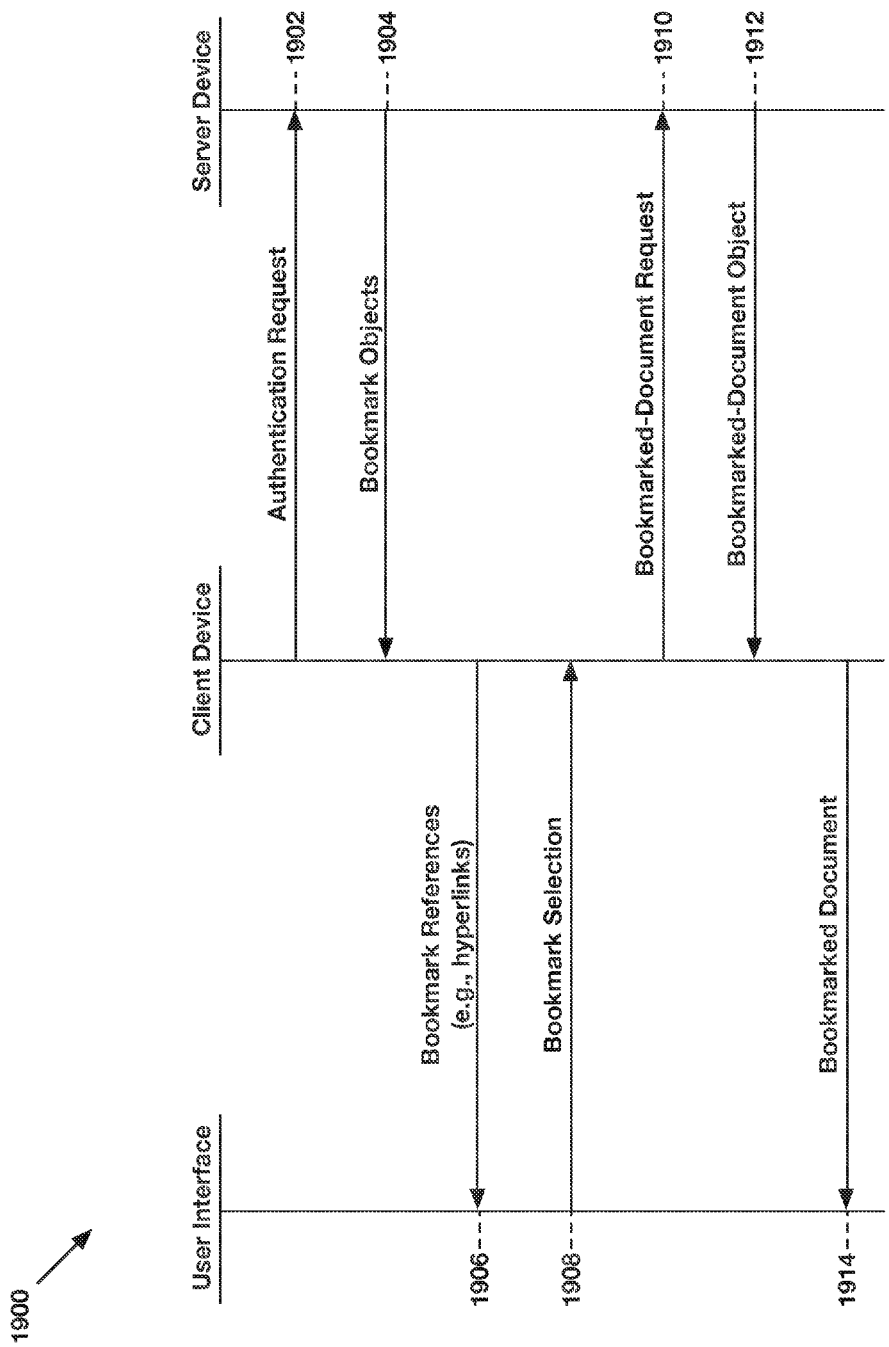
FIG. 19 is a sequence diagram of a method, in accordance with various embodiments.

FIG. 19 is a sequence diagram of a method, in accordance with various embodiments. As shown in FIG. 19, method 1900 begins at step 1902 with client device 102 sending an authentication request to server device 104. The authentication request includes (or takes the form of) an authentication credential associated with a user of an electronic-document repository.

The authentication credential could take the form of (or include) input received via a user interface. In an embodiment, the authentication credential takes the form of a username and/or a password received via a computer keyboard. In an embodiment, the authentication credential includes a one-time password that was provided to the user via an SMS text message, an email message, a smartphone application, and/or a hardware token (e.g., an RSA SecurID token) received via a keyboard. In an embodiment, the authentication credential includes an eye scan or a face scan received via a camera, a voice pattern received via a microphone, and/or a fingerprint received via a fingerprint sensor.

The authentication credential could take the form of (or include) a software token such as an X.509 certificate stored in data storage (as just one example). The authentication credential could take the form of (or include) authentication information received via a hardware token (such as a smartcard).

In an embodiment, the authentication credential comprises data that is based on the authentication credential. For example, the authentication credential could be an encrypted value of a username and/or password. As another example, the authentication credential could be a hash value of a username and/or password as provided by a hash function (such as MD5 and SHA-1, as examples). As another possibility, the authentication credential could include the username and/or password as received via a user interface and without any encryption or hashing. Those having skill in the art will recognize that the authentication credential may take other forms as well.

At step 1904, client device 102 receives from server device 104 one or more bookmark objects associated with respective bookmarks to which the authentication credential authorizes access. Each respective bookmark is associated with a respective location in a respective document, and one or more of the bookmarks have been generated by one or more other users of the electronic-document repository.

In an embodiment, the respective bookmark objects comprise respective identifiers of the respective associated bookmarks and respective names of the respective associated bookmarks. A respective identifier could be a value of a primary key of a database table storing data associated with the respective bookmark. A respective identifier could include (or take the form of) the respective name of the respective bookmark.

In an embodiment, a respective location includes (or takes the form of) a page number, a section number, a paragraph number, a line number, a heading number, and/or a heading name, among other possibilities.

At step 1906, client device 102 presents, via a user interface, one or more bookmark references corresponding to respective received bookmark objects. It should be understood that, while user interface 1708 is presented separately from client device 102 in FIG. 19, the user interface could be part of the client device (as illustrated in FIG. 17).

In an embodiment, at least one of the bookmark references comprises a respective title of the corresponding bookmark. In an embodiment, at least one of the bookmark comprises a respective identifier of the corresponding bookmark. In an embodiment, a respective bookmark reference takes the form of (or includes) a hyperlink. In an embodiment, a respective bookmark reference takes the form of a submit button of an HTML form.

At step 1908, client device 102 receives, via the user interface, an indication of a selected bookmark reference. At step 1910, client device 102 sends, to server 104, a bookmarked-document request specifying the received bookmark object corresponding to the selected bookmark reference.

In an embodiment, the bookmarked-document request is based (at least in part) on an identifier of the respective bookmark associated with the selected respective bookmark reference. As another possibility the request could include metadata based on the identifier. The request could specify the respective location in the document. Other variations are possible as well.

At step 2014, the client device receives, from server device 104, a bookmarked-document object corresponding to the specified bookmark object. The bookmarked-document object includes a portion of the associated respective document at the associated respective location.

In an embodiment, the included portion of the associated respective document takes the form of (or includes) displayable image data of the respective document at the associated respective location. In an embodiment, the included portion includes a URL, URN, and/or URI at which client device 102 can retrieve displayable image data of the respective document at the associated respective location. In an embodiment, the included portion takes the form of HTML, JavaScript, and/or Adobe Flash data that, if interpreted by client device 102, causes the client device to present the included portion of the associated respective document.

At step 1914, client device 102 presents, via the user interface, the included portion of the associated respective document.

Figure 20:
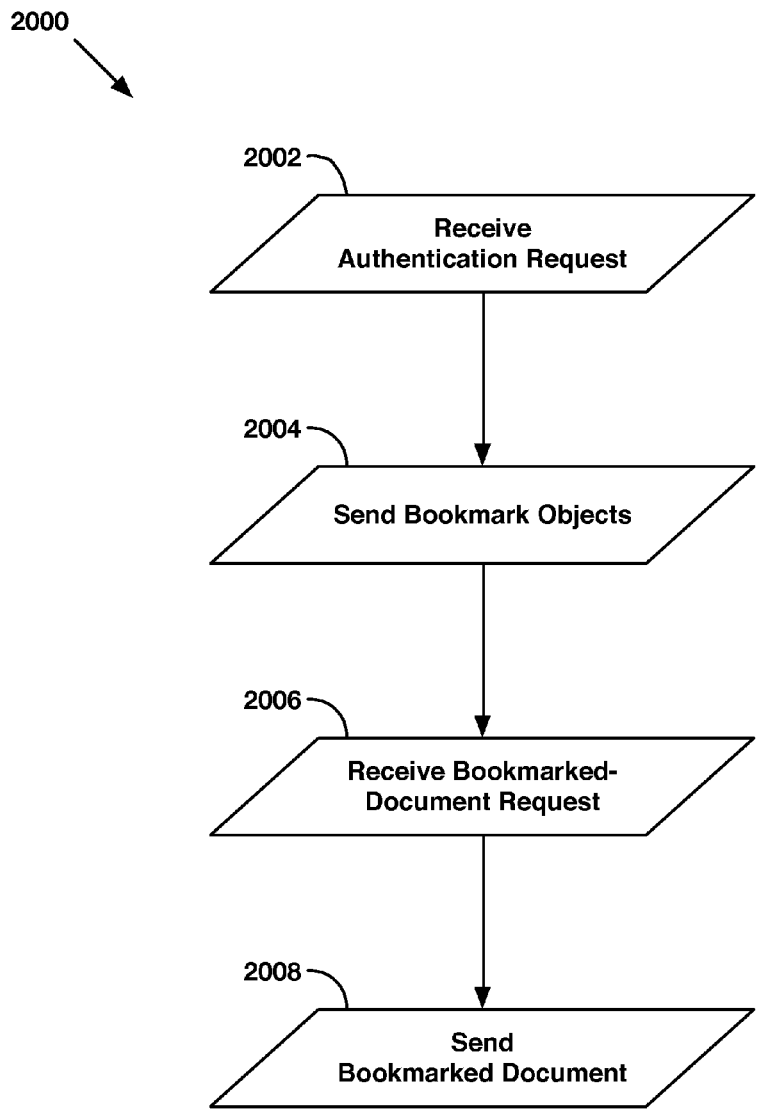
FIG. 20 is a flowchart of a method, in accordance with various embodiments.

FIG. 20 is a flowchart of a method, in accordance with various embodiments. As shown in FIG. 20, method 2000 begins at step 2002 with server device 104 receiving from client device 102 an authentication request comprising an authentication credential associated with a user of an electronic-document repository. The authentication request and/or the authentication credential could take a form similar (or identical) to the authentication request and authentication credential described above with reference to FIG. 19, respectively.

At step 2004, server device 104 sends to client device 104 one or more bookmark objects respectively associated with one or more bookmarks to which the authentication credential authorizes access. Each respective bookmark is associated with a respective location in a respective document, and one or more of the bookmarks have been generated by one or more other users of the electronic-document repository. The bookmark objects could take a form similar (or identical) to the bookmark objects described above with reference to FIG. 19.

Server device 104 sending the bookmark objects associated with the one or more bookmarks to which the authentication credential authorizes access could include the server device determining the bookmarks to which the authentication credential authorizes access, as described above with reference to FIGS. 2 through 15.

At step 2006, server device 104 receives from client device 102 a bookmarked-document request specifying at least one of the one or more bookmark objects. At step 2008, server device 104 sends to client device 104 a bookmarked-document object corresponding to the specified bookmark object. The bookmarked-document object includes a portion of the associated particular document at the associated particular location. The bookmarked-document request and/or the bookmarked-document object may take forms similar (or identical) to the bookmarked-document request and the bookmarked-document object described above with reference to FIG. 19, respectively.

V. CONCLUSION

While some example embodiments have been described above, those of ordinary skill in the art will appreciate that numerous changes to the described embodiments could be made without departing from the scope and spirit of the claims.

The invention claimed is:

1. A method carried out by a client device, the method comprising:
    sending, to a server device, an authentication request comprising an authentication credential associated with a user of an electronic-document repository;
    receiving document data relating to a document in the electronic-document repository and displaying the document data in a graphical user interface, wherein the graphical user interface includes a bookmark creation button;
    displaying a bookmark permissions interface comprising a list of user identifiers associated with the electronic-document repository;
    receiving input comprising permissions information that includes one or more user identifiers from the list of user identifiers, and transmitting, to the server device, bookmark creation data comprising the permissions information and a respective location in the document;
    receiving, from the server device, one or more user-specific bookmark objects having associated respective bookmarks, the user-specific bookmark objects having been identified in accordance with an authenticated user identifier associated with the authentication credential, each respective bookmark being associated with the authenticated user identifier and with a respective location in a respective document, one or more of the respective bookmarks having been generated by one or more other users of the electronic-document repository;

presenting, via a user interface, one or more bookmark references corresponding to respective received user-specific bookmark objects;

receiving, via the user interface, an indication of a selected bookmark reference;

sending, to the server device, a bookmarked-document request specifying the received user-specific bookmark object corresponding to the selected bookmark reference;

receiving, from the server device, a bookmarked-document object corresponding to the specified user-specific bookmark object and including a portion of the associated respective document at the associated respective location; and presenting, via the user interface, the included portion of the associated respective document.

2. The method of claim 1, wherein the authentication credential comprises at least one of a username and a password.

3. The method of claim 1, wherein the respective user-specific bookmark objects comprise respective identifiers of the respective associated bookmarks and respective names of the respective associated bookmarks.

4. The method of claim 1, wherein the respective location comprises at least one of a page number, a section number, a paragraph number, a line number, a heading number, and a heading name.

5. The method of claim 1, wherein at least one of the bookmark references comprises a respective title.

6. The method of claim 1, wherein the bookmarked-document request comprises an identifier of the respective bookmark.

7. A client device, comprising:
a processor; and
data storage comprising instructions that, when executed by the processor, cause the client device to:
send, to a server device, an authentication request comprising an authentication credential associated with a user of an electronic-document repository;
receive document data relating to a document in the electronic-document repository and display the document data in a graphical user interface, wherein the graphical user interface includes a bookmark creation button;
display a bookmark permissions interface comprising a list of user identifiers associated with the electronic-document repository:
receive input comprising permissions information that includes one or more user identifiers from the list of user identifiers, and transmit to the server device bookmark creation data comprising the permissions information and a respective location in the document:
receive, from the server device, one or more user-specific bookmark objects having associated respective bookmarks, the user-specific bookmark objects having been identified in accordance with an authenticated user identifier associated with the authentication credential, each respective bookmark being associated with the authenticated user identifier and with a respective location in a respective document, one or more of the respective bookmarks having been generated by one or more other users of the electronic-document repository;

present, via a user interface, one or more bookmark references corresponding to respective received user-specific bookmark objects;

receive, via the user interface, an indication of a selected bookmark reference;

send, to the server device, a bookmarked-document request specifying the received user-specific bookmark object corresponding to the selected bookmark reference;

receive, from the server device, a bookmarked-document object corresponding to the specified user-specific bookmark object and including a portion of the associated respective document at the associated respective location; and present, via the user interface, the included portion of the associated respective document.

8. The client device of claim 7, wherein the authentication credential comprises at least one of a username and a password.

9. The client device of claim 7, wherein the respective user-specific bookmark objects comprise respective identifiers of the respective associated bookmarks and respective titles of the respective associated bookmarks.

10. The client device of claim 7, wherein the respective location comprises at least one of a page number and a section heading.

11. The client device of claim 7, wherein at least one of the bookmark references comprises a respective title of the respective bookmark with which the respective user-specific bookmark object to which the bookmark reference corresponds is associated.

12. The client device of claim 7, wherein the bookmarked-document request comprises an identifier of the respective bookmark with which the user-specific bookmark object to which the indicated bookmark reference corresponds is associated.

13. A method carried out by a server device, the method comprising:
receiving, from a client device, an authentication request comprising an authentication credential associated with a user of an electronic-document repository;
sending, to the client device, document data relating to a document in the electronic-document repository;
receiving, from a client device, bookmark creation data comprising user permissions information and a respective location in the document;
creating and storing a bookmark object based on the bookmark creation data and including the user permissions information;
sending, to the client device, one or more user-specific bookmark objects respectively associated with one or more bookmarks, the user-specific bookmark objects identified in accordance with an authenticated user identifier associated with the authentication credential, each bookmark having user permission information that includes the authenticated user identifier and also being associated with a particular location in a particular document, one or more of the bookmarks having been generated by one or more other users of the electronic-document repository;
receiving, from the client device, a bookmarked-document request specifying at least one of the one or more user-specific bookmark objects; and
sending, to the client device, a bookmarked-document object corresponding to the specified user-specific bookmark object and including a portion of the associated particular document at the associated particular location.

14. The method of claim 13, wherein the authentication credential comprises at least one of a username and a password.

15. The method of claim 13, wherein the respective user-specific bookmark objects comprise respective identifiers of the respective associated bookmarks and respective titles of the respective associated bookmarks.

16. The method of claim 13, wherein the respective location comprises at least one of a page number and a section heading.

17. The method of claim 13, wherein at least one of the bookmark references comprises a respective title of the respective bookmark with which the respective user-specific bookmark object to which the bookmark reference corresponds is associated.

18. The method of claim 13, wherein the bookmarked-document request comprises an identifier of the respective bookmark with which the user-specific bookmark object to which the indicated bookmark reference corresponds is associated.

19. A server device, comprising:
   a processor; and
   data storage comprising instructions that, when executed by the processor, cause the server device to:
   receive, from a client device, an authentication request comprising an authentication credential associated with a user of an electronic-document repository;
   send, to the client device, document data relating to a document in the electronic-document repository;
   receive, from a client device, bookmark creation data comprising user permissions information and a respective location in the document:
   create and store a bookmark object based on the bookmark creation data and including the user permissions information:
   send, to the client device, one or more user-specific bookmark objects respectively associated with one or more bookmarks, the user-specific bookmark objects identified in accordance with an authenticated user identifier associated with the authentication credential, each bookmark having user permission information that includes the authenticated user identifier and also being associated with a particular location in a particular document, one or more of the bookmarks having been generated by one or more other users of the electronic-document repository;
   receive, from the client device, a bookmarked-document request specifying at least one of the one or more user-specific bookmark objects; and
   send, to the client device, a bookmarked-document object corresponding to the specified user-specific bookmark object and including a portion of the associated particular document at the associated particular location.

20. The server device of claim 19, wherein the authentication credential comprises at least one of a username and a password.

* * * * *